United States Patent [19]

Condon

[11] 4,203,001
[45] May 13, 1980

[54] APPARATUS FOR ESTABLISHING MULTI-ADDRESS AND CONFERENCE CALL CONNECTIONS

[75] Inventor: Denis M. Condon, Riverton, N.J.

[73] Assignee: Siemens Aktiengesellschaft, Berlin & Munich, Fed. Rep. of Germany

[21] Appl. No.: 911,720

[22] Filed: Jun. 2, 1978

[51] Int. Cl.² ........................................... H04L 11/00
[52] U.S. Cl. .................................... 178/3; 179/18 BC
[58] Field of Search ........... 179/18 BC, 1 CN; 178/3, 178/26 A, 2 R

[56] References Cited

U.S. PATENT DOCUMENTS

| | | | |
|---|---|---|---|
| 3,495,041 | 2/1970 | Gaunt, Jr. et al. | 179/18 BC |
| 3,662,095 | 5/1972 | Benmussa et al. | 178/3 |
| 3,906,151 | 9/1975 | Grossmann et al. | 178/3 |
| 4,027,098 | 5/1977 | Reisch et al. | 178/3 |

Primary Examiner—Thomas A. Robinson
Attorney, Agent, or Firm—Hill, Van Santen, Steadman, Chiara & Simpson

[57] ABSTRACT

Apparatus for establishing multi-address and conference call connections in a switching system comprising line terminators associated with respective incoming and outgoing lines, comprises a connection memory which is common to all line terminators in which there is associated with each line terminator a storage cell which includes, for the duration of a connection, an allocation between a specific calling line terminator and a specific called line terminator. Devices for scanning the line terminators and for addressing the connection memory are included, wherein the line terminators through an evaluation of the address contained in an address storage cell of a connection memory, are interconnected, respectively, only for the purpose of transmitting a message character. In addition to the line terminators for incoming and outgoing lines, additional multi-address terminators are provided. The first multi-address terminator is connected to the inputs of the following multi-address terminators for the purpose of simultaneous transmission of message characters. The address of the first multi-address terminator is entered in the storage cell associated with a calling line terminator and a connection memory and the addresses of the called line terminators participating in the multi-address operation are entered in the storage cells associated with the following multi-address terminators in the connection memory. A connection control logic is provided which is connected by way of control lines and information lines to the line terminators and multi-address terminators, and which is connected with the connection memory by way of read lines into the devices for scanning the line terminators and multi-address terminators via address lines.

4 Claims, 5 Drawing Figures

APPARATUS FOR ESTABLISHING MULTI-ADDRESS AND CONFERENCE CALL CONNECTIONS

BACKGROUND OF THE INVENTION

1. Field of the Invention

The present invention relates to an arrangement for establishing multi-address and conference call connections in a switching system comprising line terminators which are respectively associated with the incoming and outgoing lines, and more particularly to such operations in a switching system which comprises a connection memory common to all line terminators and in which there is associated with each line terminator one storage cell which, for the duration of a connection, contains the allocation between a specified calling line terminator and a specified called line terminator, and comprising devices for scanning the line terminators and for addressing the connection memory, whereby, through the evaluation of the address contained in the addressed storage cell of the connection memory, the line terminators are interconnected, in each case, only for the purpose of transmitting a message character.

2. Description of the Prior Art

In Telex switching systems, in addition to establishing a connection between subscribers, there is also the additional demand for the possibility of establishing a connection between more than two subscribers. This is then referred to as a multi-address connection or a conference call connection. The term "multi-address connection" is intended to denote that a plurality of subscribers are each capable of receiving messages transmitted from a specified subscriber, while the term "conference call connection" is intended to denote that the subscribers participating in the connection are not only capable of receiving, but also of transmitting messages. In order to set up multi-address and conference call connections, the call numbers of the subscribers participating in a multi-address connection are first transmitted from the subscriber station, which desires to set up such a connection, to the switching station, and these call numbers are evaluated at the switching station for the purpose of establishing a connection to the individual called subscriber.

In known switching systems, so-called multi-address circuits or conference call circuits, respectively, are provided for this purpose in the switching system, which receive the data transmitted by the calling subscriber station, which establishes connections to the called subscribers, and connect the latter. The messages transmitted by a calling subscriber station then reach all other subscribers participating in the multi-address connection.

In more recent switching systems, in which the connection established is carried out pursuant to the control of a central program, such installations are no longer provided. Switching systems of this type contain a subscriber terminator for each incoming and outgoing line, and a common connection memory for all subscriber terminators in which a separate storage cell is associated with each subscriber terminator. Those particular data which are required for the transmission of messages between interconnection subscribers are respectively entered in the storage cell for the duration of a connection. The entry of the data in the connection memory takes place, in each instance, at the beginning of a connection, from a central location, e.g., due to programmed operating cycles, in a central processing unit. A storage cell contains, among other things, the number of that particular line terminator with which the line circuit, to which the storage cell is allocated, is connected. All line terminators are constantly scanned in a cyclical fashion, whereby the storage cell in the connection memory associated with the scanned line terminator is also simultaneously addressed. If a message character has arrived on an incoming line and if, at the time of scanning, the line terminator associated with this line has the message character available at its output, the address contained in the addressed storage cell is read out therefrom. This address is the line number of that particular line terminator to which the message character must be transferred. By virtue of the address, the respective line terminator is activated, the message character is transferred to the latter and transmitted to the called subscriber by way of the outgoing line. Subsequent to the transmission of the message character to the addressed line terminator, scanning of the additional line terminators is resumed. In this manner, all line terminators are scanned, and message characters occurring to the addresses contained in the connection memory are transmitted to specified subscriber terminators. A switching system such as this is described, by way of example, in the publication "Siemens System EDX," Edition 1, January 1975.

SUMMARY OF THE INVENTION

It is the object of the present invention to make possible the establishment of multi-address connections and/or conference call connections in a switching system of the type mentioned above.

In addition, another object of the invention is to jointly utilize the line terminator already present in such a switching system for the purpose of establishing multi-address and/or conference call connections.

Another object of the invention resides in providing a time-delayed transmission of messages transmitted by a subscriber entitled to the multi-address duration and intended for a plurality of multi-address subscribers.

According to the invention, the above objects are achieved by virtue of the fact that, in addition to the line terminators for incoming and outgoing lines, additional multi-address terminators are provided, the first multi-address terminator of which is connected with the inputs of the following multi-address terminators for the purpose of simultaneous transmission of message characters, that the address of the first multi-address terminator is entered in the storage cell associated with a calling line terminator in the connection memory, and that the addresses of the called line terminators participating in the multi-address operation are entered in the following storage cells associated with the multi-address terminators in the connection memory. A connection control logic is provided which is connected by way of control lines and information lines to the line terminators and multi-address terminators, and is also connected by way of read lines to the connection memory and by way of address lines to the devices for scanning the line and multi-address terminator.

BRIEF DESCRIPTION OF THE DRAWINGS

Other objects, features and advantages of the invention, its organization, construction and operation, will be best understood from the following detailed description, taken in conjunction with the accompanying drawings, on which.

DESCRIPTION OF THE PREFERRED EMBODIMENTS

Figure 1:
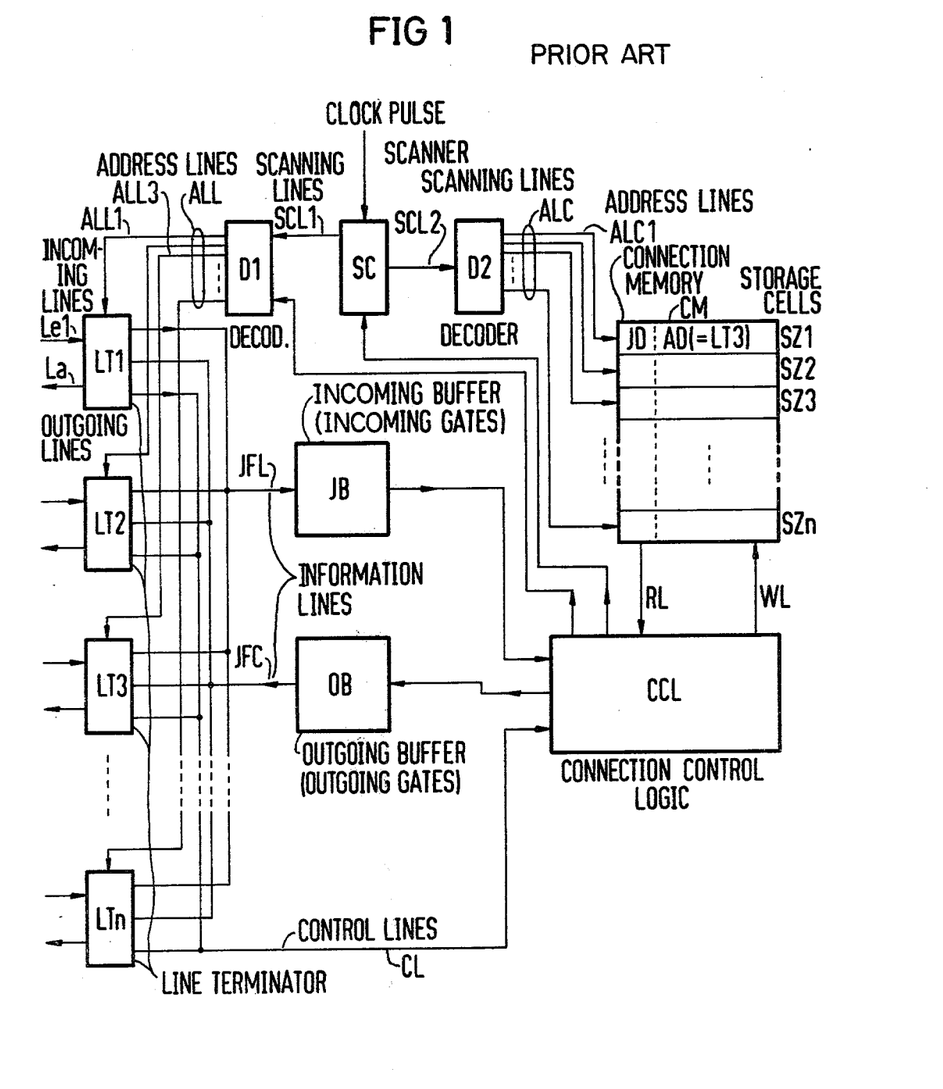
FIG. 1 is a block circuit diagram of a prior art system, on the basis of which the establishment of a normal connection between two subscribers is explained.

Referring to FIG. 1, the portions of a switching system which are required for the transmission of messages to the specified outgoing lines and arriving on incoming lines, pursuant to the control of addresses contained in a connection memory, is illustrated. A plurality of line terminators LT1-LTn are associated with respective incoming lines Le and outgoing lines La and are cyclically scanned by a scanner SC, whereby the storage cells SZ1-SZn, which are located in a connection memory CM and associated with the scanned line terminators are also simultaneously addressed. To this end, the scanner SC, which is controlled by a central clock pulse T, is connected by way of a plurality of scanning lines SCL1 and SCL2 to a first decoder D1 and a second decoder D2, respectively. Both of the decoders D1 and D2, as well as the scanner SC, are constructed in a manner which is well known in the art. The first decoder D1 is connected by way of address lines ALL to the line terminators LT1-LTn, whereas the second decoder is connected by way of address lines ALC with the individual storage cells SZ1-SZn of the connection memory CM. The line terminators LT1-LTn and the corresponding storage cells SZ1-SZn are operated by way of the address lines ALL and ALC in cyclic sequence, respectively. Each line terminator LT1-LTn is connected via an information line IFL with an input buffer IB, and by way of information lines IFC to an output gate OG. In addition, control lines CL from each line terminator LT-LTn are connected to a central connection control logic CCL. In practice, of course, the data lines IFL and IFC, as well as the control lines CL, which are illustrated in the exemplary embodiment as a single line, respectively, actually comprises a plurality of parallel lines in each case. By way of the input buffer IB, the messages transmitted on the information lines IFL are transmitted to the connection control logic CCL, and from the connection control logic CCL these messages are fed by way of the output gate OG to the information lines IFC. The connection control logic CCL is connected to the connection memory CM by way of read lines RL and write lines WL. The connection control logic CCL is connected to the scanner SC by way of an additional control line in order to transmit to the scanner SC a control signal SCS which switches the scan operation on or off. Finally, the connection control logic CCL is additionally connected by way of the address lines ADL with the first decoder. When the scanner SC is switched off, an address reaches the first decoder D1 over the address lines ADL, and the address is evaluated therein for the purpose of operating one of the address lines ALL leading to the line terminators LT1-LTn. In each of the storage cells SZ1-SZn associated with the line terminators LT1-LTn, the connection memory CM contains informations ID characterizing the status of the line terminator during the scan interval, and an address AD which, in the connected state of the address, corresponds to that particular line terminator with which the scanned line terminator unit is connected.

The method of operation of the system illustrated in FIG. 1 will be explained in the following on the basis of an exemplary situation. It is assumed that the line terminator LT1 is connected to the line terminator LT3, and that the messages arriving on the incoming line Le1 are to be transmitted to the outgoing line La3. By way of the scanner SC and the two scanned lines SCL1 and SCL2, an address corresponding to the first line terminator LT1 is transmitted to the two decoders D1 and D2. In the first decoder D1, the address line ALL1 is activated, and the first line terminator LT1 is interrogated. By way of an address line ALC1, the storage cell SZ1 associated with the interrogated line terminator LT1 is simultaneously addressed. Under the assumption that a message character has arrived on the incoming line Le1, and that the message character is available at the output of the line terminator LT1 at the time of scanning, the message character is transferred into the input buffer IB by way of the information line IFL. At the same time, the line terminator LT1 transmits a control signal over the control lines CL, which signals are received and evaluated in the connection control logic CCL. By virtue of this control signal, there is a recognition in the connection control logic CCL that the data received over the information line IFL by the input buffer IB concerns a message character. At the same time, the data read from the addressed storage cell SZ1 are also available to the connection control logic CCL and from this data it is recognized that the selected line terminator LT1 concerns a line terminator in the connected state, and that the message characters delivered by the line terminator LT1 must be transferred to the line terminator LT3. These data are contained in the storage zone ID or in the address zone AD of the first storage cell SZ1 and are transferred in parallel fashion into the connection control logic CCL by way of the read lines RL. The signal SCS is then formed in the connection control logic CCL to stop the scanner SC. The address AD received from the storage cell SZ1 is transmitted by way of the address lines ADL to the first decoder D1 and is decoded to cause actuation of the address line ALL3, by way of which the desired line terminator LT3 is reached. The message character intermediately stored in the input buffer IB is transmitted to the line terminator LT3 by way of the output gate OG and the information line IFC. Transmission to the outgoing line La3 takes place in a manner not illustrated herein by means of the line terminator LT3. With the through-connection of the message character from the input buffer IB by way of the output gate OG to the line terminator LT3, the stop signal SCS for the scanner SC is again switched off, and the scanner continues its scan cycle with the activation of the next address line ALL2, whereby, via the address line ALC2, the storage cell SZ2 associated with the line terminator LT2 is also simultaneously addressed. Thus, all line terminators are cyclically scanned in the manner described above and, in the case of a message character present at the output of a scanned line terminator, the message character, pursuant to the control of the address contained in the corresponding storage cell of the connection memory, is transmitted to the line terminator specified by the address.

However, with the measures described up to this point, there are always only two subscribers which are interconnected by way of their line terminators. In order to make it possible, in a switching system of the type described, for more than two subscribers to participate in a connection in a simple manner and without any special increased expense, i.e. to make it possible to set up multi-address connections or conference call connections, according to the present invention, a series of additional line terminators are provided, which line terminators are hereinafter referred to as the multi-address terminators, and additional storage cells are provided in the connection memory which are associated with the multi-address terminators. The number of multi-address terminators and, hence, also the number of the additional storage cells in the connection memory, depends upon how many subscribers in toto are entitled to multi-address operation in the switching system, on the one hand, and the maximum number of subscribers permitted to participate in a multi-address connection or in a conference call connection, on the other hand. To this end, the multi-address terminators are combined into groups whose number corresponds to the subscribers participating in a multi-address connection, and the first of which is connected with all of the following multi-address terminators within the group such that the message character transmitted by way of the first multi-address terminator simultaneously reaches all additional multi-address terminators of that particular group. By virtue of an address entered into the storage cells associated with the multi-address terminators during the establishment of a connection, via the normal subscriber terminators participating in the multi-address operation, the same message character is always transmitted to different subscribers during the cyclic interrogation of the multi-address terminators.

Figure 2:
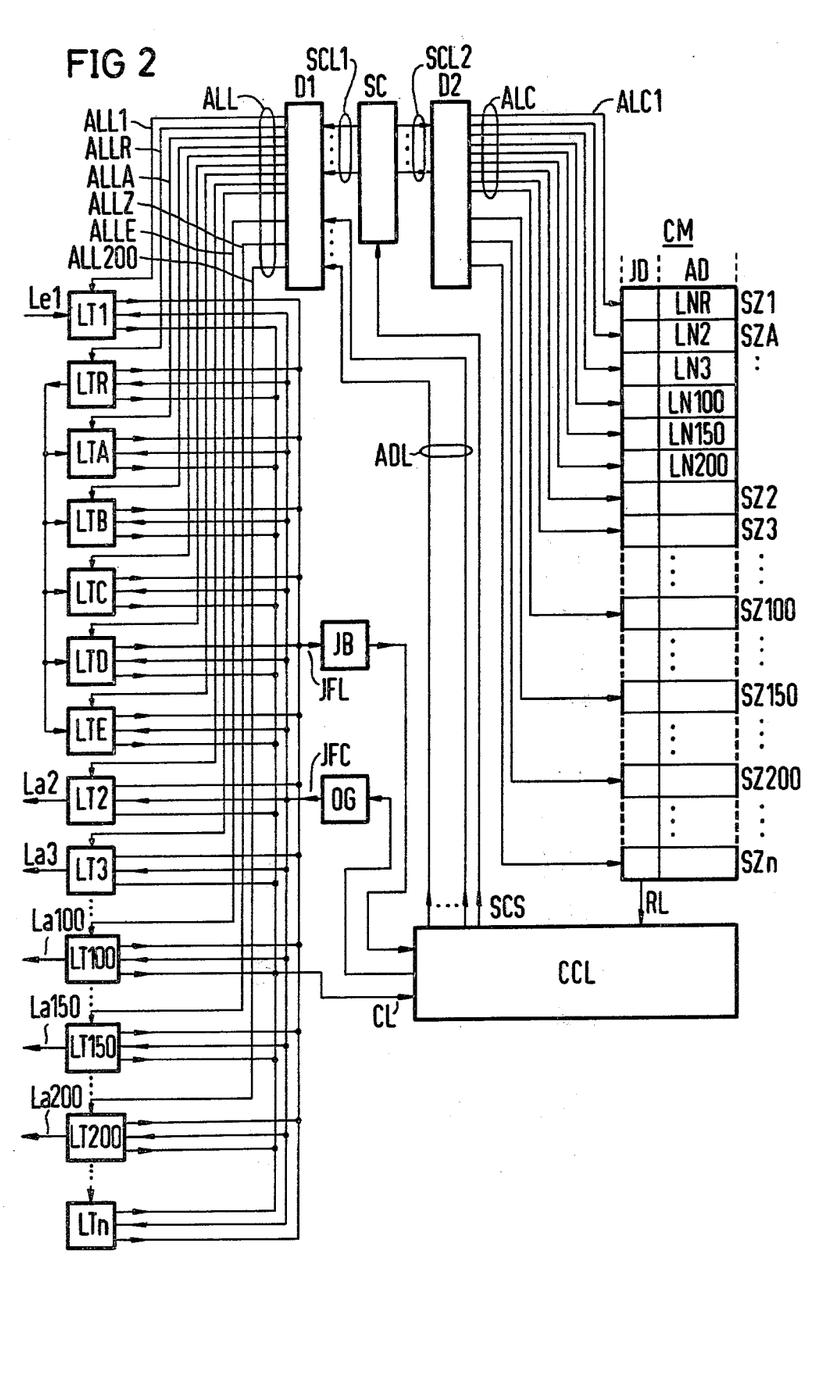
FIG. 2 is an exemplary embodiment of the invention illustrated in the form of a block circuit diagram, on the basis of which the establishment of a multi-address connection is explained.

In order to explain the multi-address mode of operation in greater detail, in which more than two subscribers are connected with one another, reference is made to FIG. 2. The circuit illustrated in FIG. 2 again contains n line terminators LT1-LTn to which an incoming line Le and an outgoing line La are connected, respectively. In addition, it contains the connection memory CM which is common to all line terminators, the connection control logic CCL, the units required for the selection of the line terminators or for the addressing of the individual storage cells in the connection memory, respectively, namely the two decoders D1 and D2, as well as the scanner SC, and finally, the input buffer IB and the output gate OG. These components correspond in construction to those components already described in connection with FIG. 1. Their mode of operation also corresponds to the mode of operation described above with respect to FIG. 1. In addition to the normal line terminators LT1-LTn, six multi-address terminators LTR and LTA-LTE are provided in this particular example, which multi-address terminators are connected to the switching system in the same manner as the line terminators LT1-LTn, to the first decoder D1, to the input buffer IB, to the output gate OG, and to the connection control logic CCL, via the address lines ALL, the information lines IFL and IFC, and the control lines CL. As in the case of the line terminators LT1-LTn, respective storage cells SZA-SZE are provided in the connection memory CM and are associated with the multi-address terminators LTA-LTE, each of which storage cells, pursuant to selection of the respective multi-address terminator, is addressed via one of the address lines ALC.

In the following, the transmission of the arriving message characters from a calling subscriber over the incoming line Le1 to five called subscribers will be described. The subscribers in question here are those associated with the line terminators LT2, LT3, LT100, LT150 and LT200. During the establishment of the connection, the address of the first associated address from a group of multi-addressed terminators—in this example, the address LNR—has been entered into the storage cell SZ1 associated with the line terminator LT1, in response to a multi-address signal in the form of a special call block which is generated in response to the calling subscriber selecting a special multi-address number. In addition, the storage cells SZA-SZE associated with the multi-address terminators LTA-LTE of the group, contain the numbers of those particular line terminators to which the message arriving over the incoming line Le1 is to be further transmitted. Accordingly, the line numbers LN2, LN3, LN100, LN150 and LN200 are located at the corresponding locations in the connection memory CM. The first multi-addressed terminator LTR is connected to the following multi-addressed terminators LTA-LTE such that the incoming message can be simultaneously transmitted to the following multi-address line terminators in each instance. If, under these conditions, the cyclic interrogation of the line terminators begins, the first terminator address line ALL1 and the first memory address line ALC1 are selected in the first decoder D1 and in the second decoder D2, respectively. As previously described, the line terminator LT1 thus selected transmits, on the information lines IFL, the message received over the incoming line Le1, into the input buffer IB, and simultaneously delivers a control signal in the form of a control word to the connection control logic CCL by way of the lines CL. As will be described below with reference to FIG. 3, on the basis of the control signals in the connection control logic CCL, it is recognized that it is here a question of incoming information. At the same time recognition is also made, on the basis of the information ID read from the addressed storage cell SZ1 that it is a question of through-connection of the incoming information. Through transmission of the scanner control signal SCS, the scanner SC is stopped and the address LNR contained in the addressed storage cell SZ1 is delivered over the address lines ADL to the first decoder D1. The address line ALLR is thus selected at the output of the first decoder AD1, the address line ALLR being connected to the multi-addressed terminator LTR. By way of the output gate OG, the message contained in the input buffer IB is transmitted over the information lines IFC to the multi-address terminator LTR. By way of the multi-address terminator LTR, the message is simultaneously transmitted to all of the multi-address terminators LTA-LTE of this group. The scanner SC is then again switched on and the scanning of the terminators is continued. Now, the multi-addressed terminator LTA is selected over the address line ALLA, the message available is transferred to the input buffer IB in the manner described above, over the information lines IFL. However, the storage cell SZA associated with the multi-address terminator LTA is simultaneously addressed in the connection memory CM. The address of the first called subscriber is contained in the storage cell SZA, in this example the address LN2, which reaches the connection control logic CCL over the read lines RL. The scanner SC is again stopped and the address LN2 read from the connection memory CM is transmitted over the address lines ADL to the first decoder D1. By decoding the address LN2, the address line ALL2 is selected, the address line ALL2 being connected to the line terminator LT2. In the manner described above, the message contained in the input buffer IB reaches the line terminator LT2 by way of the information lines IFC, and from there is transmitted over the outgoing line La2. These operations are repeated until the last multi-address terminator LTE is selected by way of the address line ALLE, whereby the storage cell SZE associated with the latter is simultaneously addressed, and the address information LN200 contained therein is applied to the first decoder D1. Subsequently, the decoder D1 selects the line terminator LT200 by way of the address line ALL200, such that the information contained in the input buffer IB is transmitted thereto via the output gate or buffer OG and the information lines IFC and, by way of the line La200, is transmitted to the last of the subscribers participating in the multi-address connection. The message character arriving over the incoming line Le1 has thus been transmitted to five called subscribers.

Figure 3:
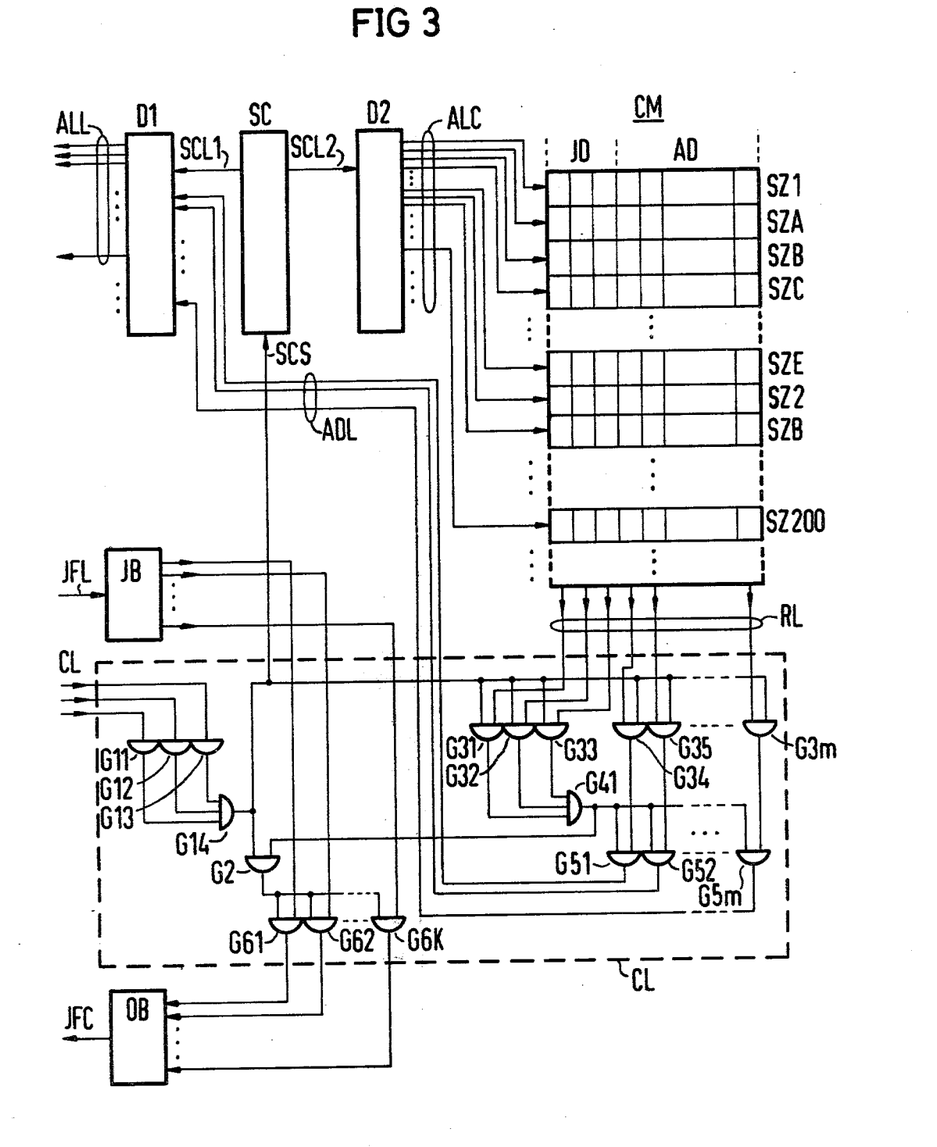
FIG. 3 is a schematic logic diagram of a control logic suitable for realizing the invention.

An exemplary embodiment of the construction of the connection control logic CCL is illustrated in FIG. 3. It is assumed here that the control information arriving by way of the control lines CL is transmitted in the form of a 3-bit word, and that the information transmitted over the information lines IFL and IFC comprise K-bits, respectively. In the present example, one proceeds from the fact that, in all instances in which a message character is ready for transmission in a line terminator, the bit combination 001 is transmitted as the control information word. In addition, the connection state of a line terminator is characterized by the bit combination ID=111 in the storage cell associated with this line terminator. If, by way of example, the line terminator LT1 was selected by the scanner SC and the first decoder D1, and if the line terminator LT1 transmits a message character over the information lines IFL to the input buffer IB, and simultaneously transmits the bit combinations 001 on the control lines CL, this bit combination is evaluated in the connection control logic CCL in a first gate arrangement G11–G14 for the purpose of forming a preparatory signal for the gate G2 and for the gates G31–G3m. The bits of the information word ID and of the address information word AD are transmitted over the read lines RL from the storage cell SZ1 addressed via the second decoder D2 and are through-connected to the output of the gates G31–G3m. The 3 bits of the information word ID are evaluated in a gate G41 whereby, on the basis of the conditions assumed here in the case of a bit combination ID=111, an output pulse is formed by the gate 41 to unblock the gate G2 and a plurality of gates G51–G5m. By way of the gates G51–G5m, the address AD of the desired subscriber terminator contained in the storage cell SZ1 in the form of m bits is transmitted over the address lines ADL to the first decoder D1, and simultaneously, by way of a plurality of gates G61–G6k, the message character which was intermediately stored in the input buffer IB, in the form of a message character comprising k bits, is transmitted to the output gate or output buffer OG. In the first decoder D1, on the basis of the address transmitted over the address lines ADL, a specified address line is selected, so that the line terminator or multi-address terminator connected with this line receives the message character transmitted on the information lines IFC.

Since the scanner SC operates in a well known manner in a clock-pulse-controlled fashion, after the stop signal SCS has been switched off, the scan operation is continued with the next clock pulse at the location previously reached, i.e. by way of the cyclically following address line the line terminator or multi-address terminator connected with the address line is selected.

Figure 4:
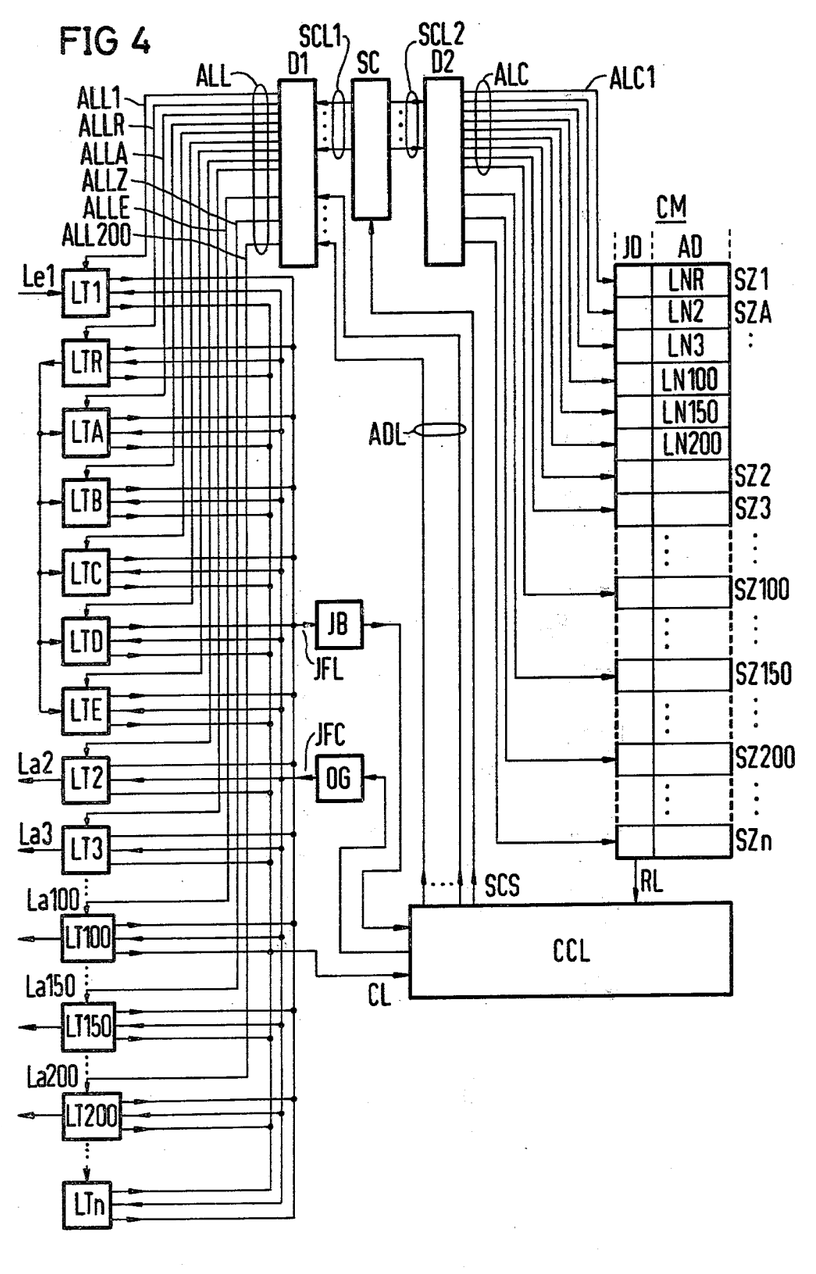
FIG. 4 is an exemplary embodiment, in the form of a schematic logic diagram, on the basis of which a conference call connection is explained.

However, the described circuit arrangement also makes conference call operation possible, in which the participating subscribers not only receive the information transmitted by a subscriber station, but, in an opposite direction, are also able to transmit messages to all participating subscribers. In order to explain the mode of operation for a conference call, reference is made to FIG. 4. The circuit arrangement illustrated in FIG. 4 largely corresponds to the arrangement described in FIG. 2 with respect to construction and mode of operation. A conference call operation is made possible by virtue of the fact that the address of the first multi-address terminator of a group of multi-address terminators is entered in the storage cell which is associated with such a line terminator by way of which a called subscriber participating in the multi-address operation is connected. This can take place following a multi-address message transmission, respectively; for example, subsequent to the transmission of the end-of-message character by the calling subscriber. The first of these subscribers participating in the multi-address operation which subsequently transmits a signal which has been defined as the conference call signal, is regarded as a new calling subscriber. In the example of FIG. 4, it is assumed that, of the five subscribers which were active in the preceding multi-address operation, the subscriber which is connected to the normal line terminator LT100 is the first to transmit a conference call signal. The address LNR of the first multi-address terminator LTR is then entered into the storage cell SZ100 assigned to the line terminator LT100, and the address LN1 of the previously called line terminator LT1 is entered into that particular storage cell in which the address of the presently calling line terminator LT100 was previously entered. Each message transmitted by the line terminator LT100, which is now regarded as the calling line terminator (calling subscriber) is transmitted, during interrogation of the line terminator LT100, by evaluating the address LNR read from the connection memory CM to the first multi-address terminator LTR, and from the latter, is transmitted in parallel to the following multi-address terminators LTA–LTE of the group. This takes place in the manner described on the basis of FIGS. 2 and 3. The message thus transferred from the multi-address terminators LTA–LTE during interrogation over the information lines IFL into the input buffer IB is thus transmitted to the participating line terminator units LT2, LT3, LT1, LT150 and LT200 pursuant to the access of the addresses LN2, LN3, LN1, LN150 and LN200 contained in the corresponding storage cells SZA–SZE of the connection memory CM. After completion of message transmission, the calling subscriber again transmits an end-of-message character, whereupon another subscriber participating in the conference call operation is able to transmit the conference call signal. In this case, the number of the first multi-address terminator is again entered into the storage cell assigned to the corresponding line terminator unit, and the address in the storage cell associated with the line terminator previously regarded to be in the calling condition is entered by the address of the line terminator presently regarded as being the calling party. In this manner, each of the subscribers participating in the multi-address operation is able to transmit a message to all other subscribers of that connection by transmitting the conference call signal.

Figure 5:
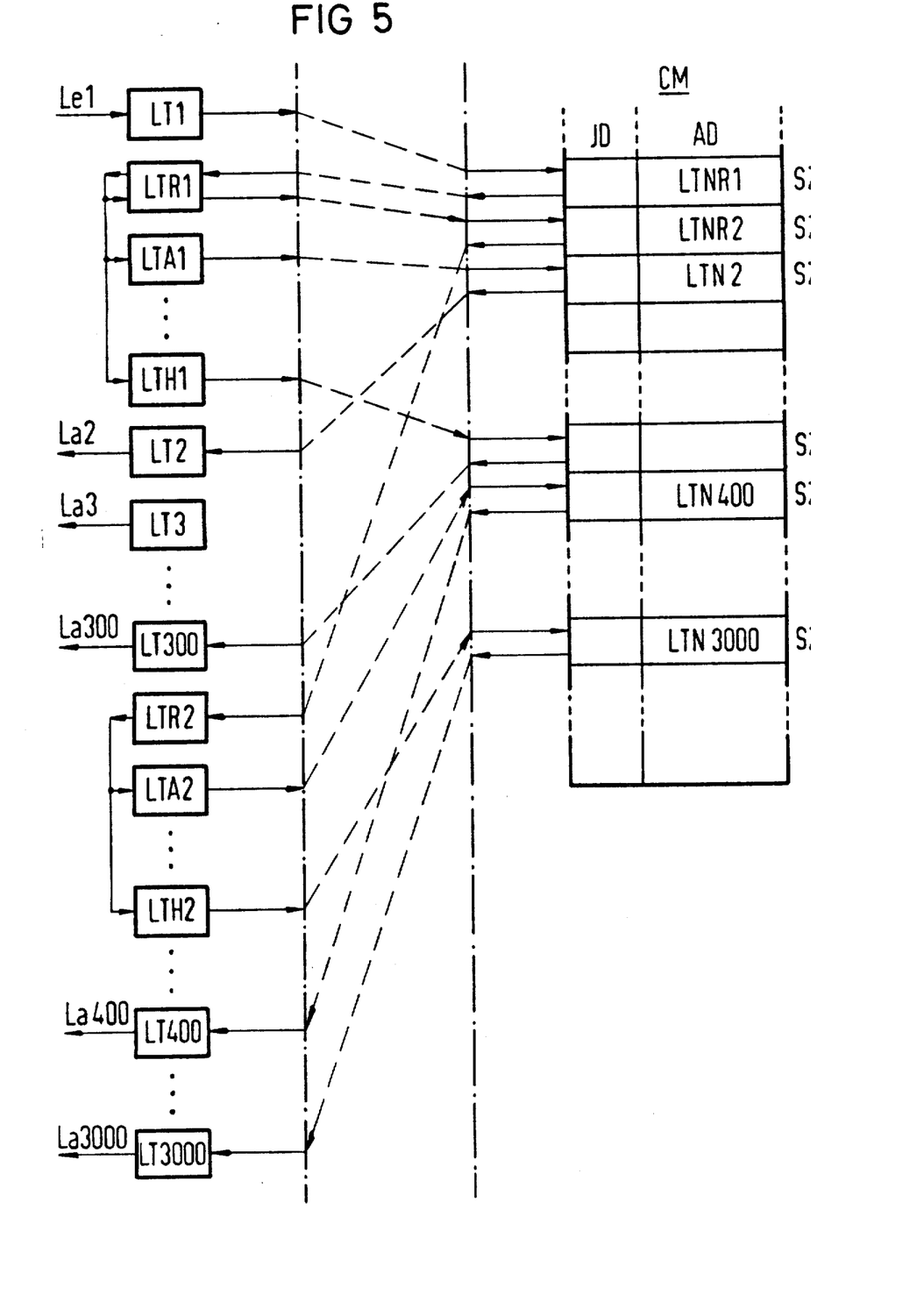
FIG. 5 illustrates an arrangement wherein the number of subscribers of a multi-address connection or a conference call connection may be provided in any desired number.

The present invention has been explained on the basis of an example in which a maximum of five subscribers can, in each instance, participate in a multi-address connection or in a conference call connection. Of course, it is possible to increase the maximum number of participating subscribers. For example, in the case of a maximum number of eight subscribers participating in a multi-address connection or in a conference call connection, nine multi-address terminators are provided, whereby, again, the first is connected with the eight following multi-address terminators in such a fashion that the incoming information from the first multi-address terminator is transmitted simultaneously to the eight additional multi-address terminators. However, in the case of a very large number of subscribers to which multi-address messages are to be transmitted, or which are to participate in conference call connections, it is expedient to provide several of such groups of multi-address terminators. An example of this is illustrated in FIG. 5 in which there are several groups of multi-address terminators, with each group including eight multi-address terminators. A first group contains the multi-address terminators LTR1, LTA1-LTH1, and a second group contains the multi-address terminators LTR2, LTA2-LTH2. In FIG. 5 only the subscriber terminators, the multi-address terminators, the central connection memory CM and the information paths extending between the subscriber terminators, the multi-address terminators and the connection memory are illustrated. More specifically, the circuit is constructed in the manner described with respect to FIGS. 2-4. In FIG. 5 it is apparent that, during interrogation of the first line terminator LA1 which is receiving a multi-address message for a plurality of subscribers on its incoming line Le1, the first multi-address terminator LTR1 of the first group is selected through evaluation of the address LNR1, and thus the message is transmitted in parallel to the following multi-address terminators LTA1-LTH1 of the first group. During interrogation of the multi-address terminator LTR1, the address of the first multi-address terminator LTR2 of the second group is removed from a storage cell SZR1 assigned to the multi-address terminator LTR1, and the message is now also transmitted to the multi-address terminator LTR2. The message is then fed in parallel to all following multi-address terminators LTA2-LTH2 of the second group. Through cyclic interrogation of all multi-address terminators and subscriber terminators in the manner previously described, the message characters arriving over the incoming line Le1 are therefore transmitted to 16 different subscriber terminators and transmitted by way of the corresponding outgoing lines. From the example, of course, only the subscriber terminators LT2, LT300, LT400 and LT3000, and the corresponding outgoing lines La2, La300, La400 and La3000 are illustrated.

Although the present invention has been described by way of particular illustrative embodiments, many changes and modifications of the invention may become apparent to those skilled in the art without departing from the spirit and scope thereof. It is therefore intended that the patent warranted hereon cover all such changes and modifications as may reasonably and properly be included within the scope of this contribution to the art.

What is claimed is:

1. In a switching system of the type in which line terminators are respectively associated with the incoming and outgoing lines, wherein a connection memory is common to all line terminators and which includes a respective storage cell assigned to each line terminator which stores, for the duration of a connection, the allocation between a specified calling line terminator and a specified called line terminator, and wherein devices are provided for scanning the line terminators and for addressing the connection memory, and means for evaluating the address contained in the addressed storage cell of the connection memory to cause interconnection of the line terminators only for the purpose of transmitting a message character, the improvement therein of an arrangement for establishing multi-address connections and conference call connections, said arrangement, in combination with said switching system, comprising:

a plurality of multi-address terminators, a first of said multi-address terminators connected to the inputs of the remaining multi-address terminators for simultaneously transmitting received message characters thereto;

means for entering the address of said first multi-address terminator in the storage cell in the connection memory assigned to a calling line terminator;

additional storage cells in the connection memory assigned to respective ones of said remaining multi-address terminators;

means for storing the addresses of the called line terminators of a multi-address call in respective ones of said additional storage cells;

scanning means, including decoding means, for scanning said line and multi-address terminators and for scanning said connection memory; and connection control logic means connected to said line and multi-address terminators, to said scanning means and to said connection memory for controlling scanning and information transfer between calling and called terminators.

2. The improved switching system of claim 1, comprising:

a plurality of groups of said multi-address terminators with each first multi-address terminator of each group connected to the inputs of the remaining multi-address terminators of that group for the purpose of simultaneous transfer of incoming message characters thereto;

said additional storage cells of said connection memory being assigned to a first of said groups and further storage cells assigned to the multi-address terminators of others of said groups;

means for entering the address of the first multi-address terminator of said one group in the storage cell associated with a calling line terminator;

means for storing the address of the first multi-address terminator of a second group in that storage cell assigned to the first multi-address terminator of said one group; and means for storing the addresses of the line terminators which are to participate in the multi-address operation in the respective ones of said additional and further storage cells of said connection memory.

3. The improved switching system of claim 2, wherein said connection control logic means comprises first switching means for evaluating incoming control information from said terminators;

second switching means for receiving the information contained in an addressed storage cell of said connection memory;

third switching means for transmitting the address information received from said connection memory to said decoding means for scanning said line and multi-address terminators; and fourth switching means for connecting information received from a calling line terminator or multi-address terminator selected by said decoding means and the called line terminator or multi-address terminator selected by the address in the storage cell of the connection memory assigned to the selected calling line terminator or multi-address terminator.

4. The improved switching system of claim 3, comprising means for exchanging the address information of said storage cells of said connection memory in response to call signals transmitted by a called line terminator participating in the multi-address operation wherein the address of the first multi-address terminator of a group is entered in the storage cell assigned to the called line terminator and the address of the line terminator considered previously to be the calling line terminator is entered in the storage cell which contains the address of the line terminator previously considered to be a called line terminator.

* * * * *

UNITED STATES PATENT AND TRADEMARK OFFICE
CERTIFICATE OF CORRECTION

PATENT NO. : 4,203,001

DATED : May 13, 1980

INVENTOR(S) : Denis Myles Condon

Page 1 of 2

It is certified that error appears in the above-identified patent and that said Letters Patent is hereby corrected as shown below:

Figure 5 should be added as per attached sheet.

Signed and Sealed this

Twenty-fourth Day of May 1983

[SEAL]

Attest:

DONALD J. QUIGG

Attesting Officer     Acting Commissioner of Patents and Trademarks

FIG 5